May 13, 1947.  C. W. MOTT  2,420,554
FLUID PRESSURE REGULATION AND CONTROL APPARATUS
Filed May 12, 1943  7 Sheets-Sheet 1
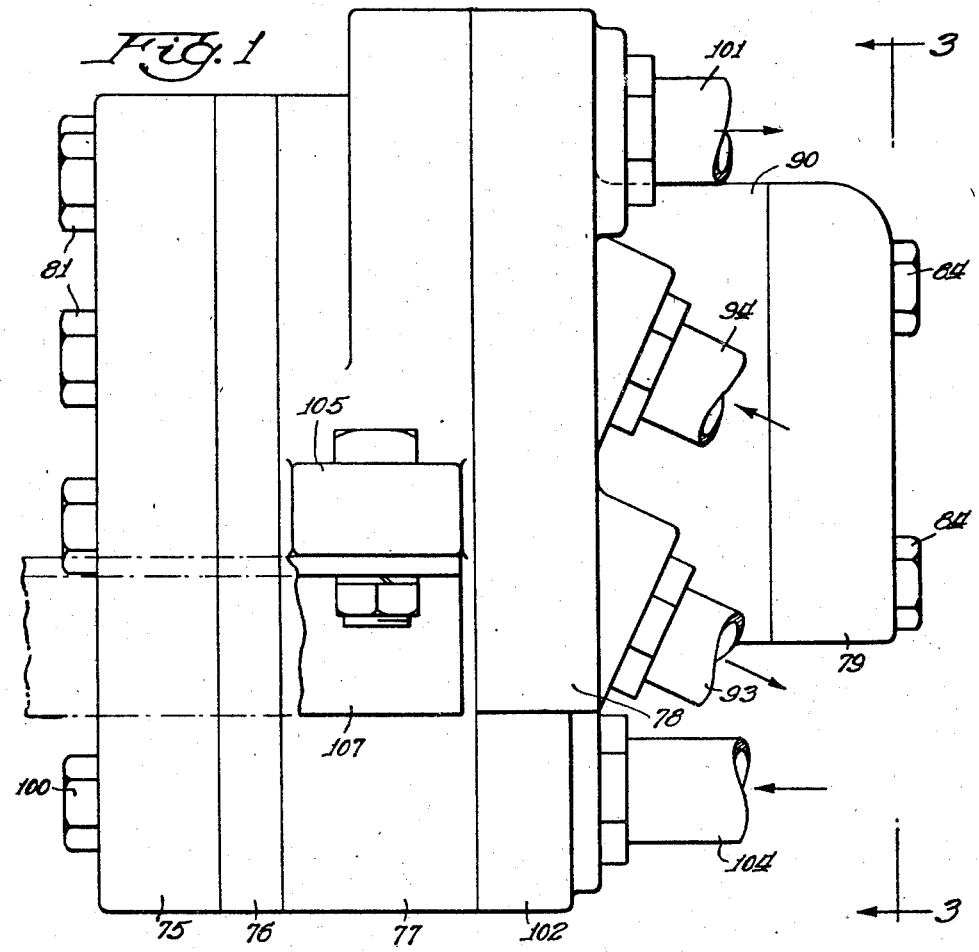
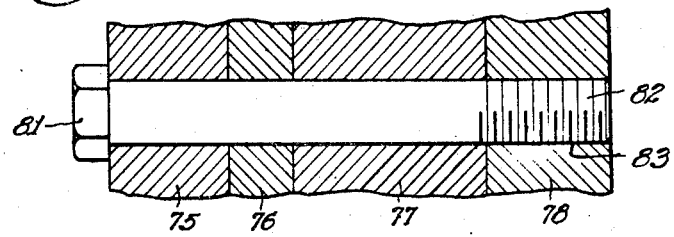
Inventor:
Carl W. Mott
By: Paul O. Pippel
Atty.

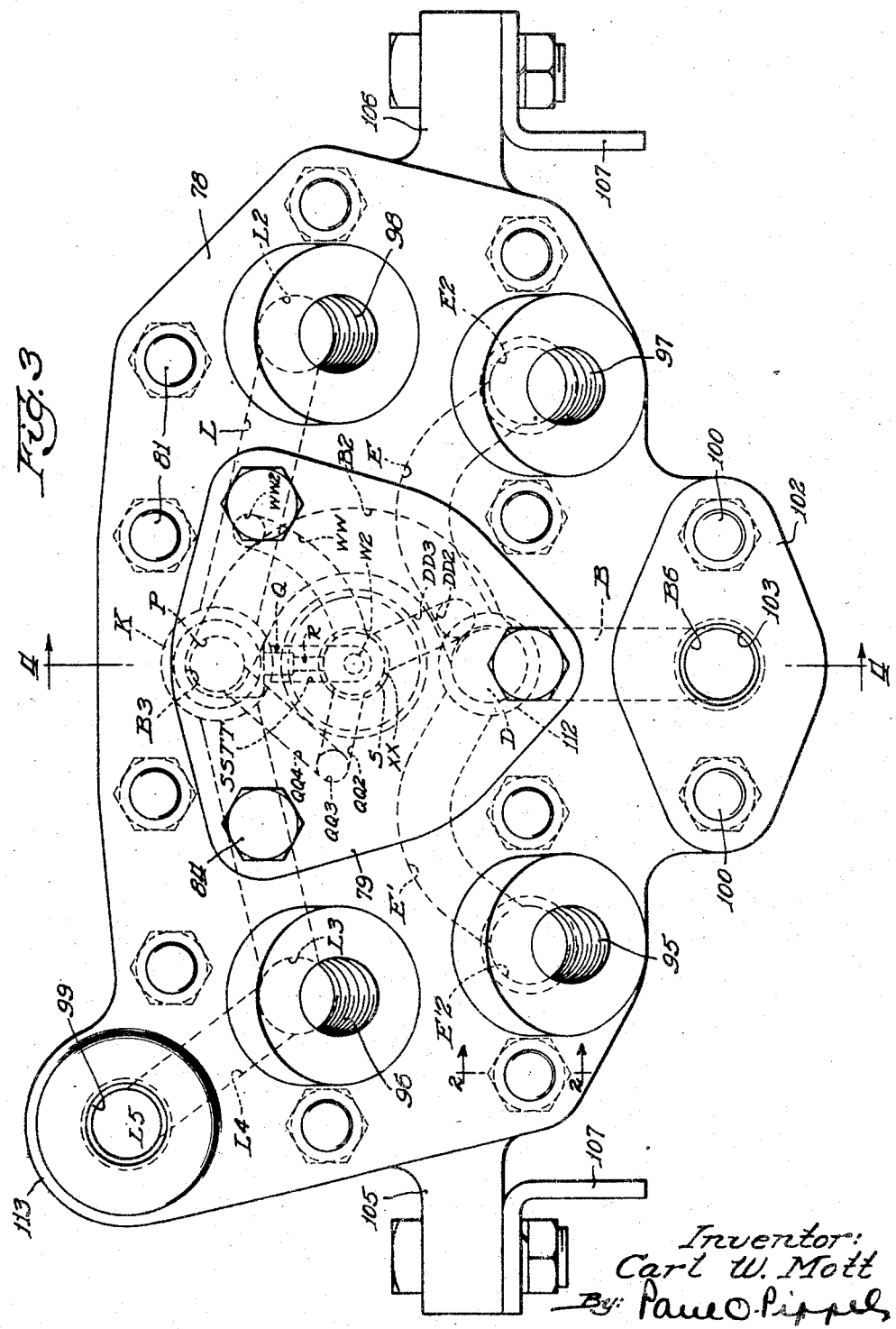

May 13, 1947.  C. W. MOTT  2,420,554
FLUID PRESSURE REGULATION AND CONTROL APPARATUS
Filed May 12, 1943  7 Sheets-Sheet 3
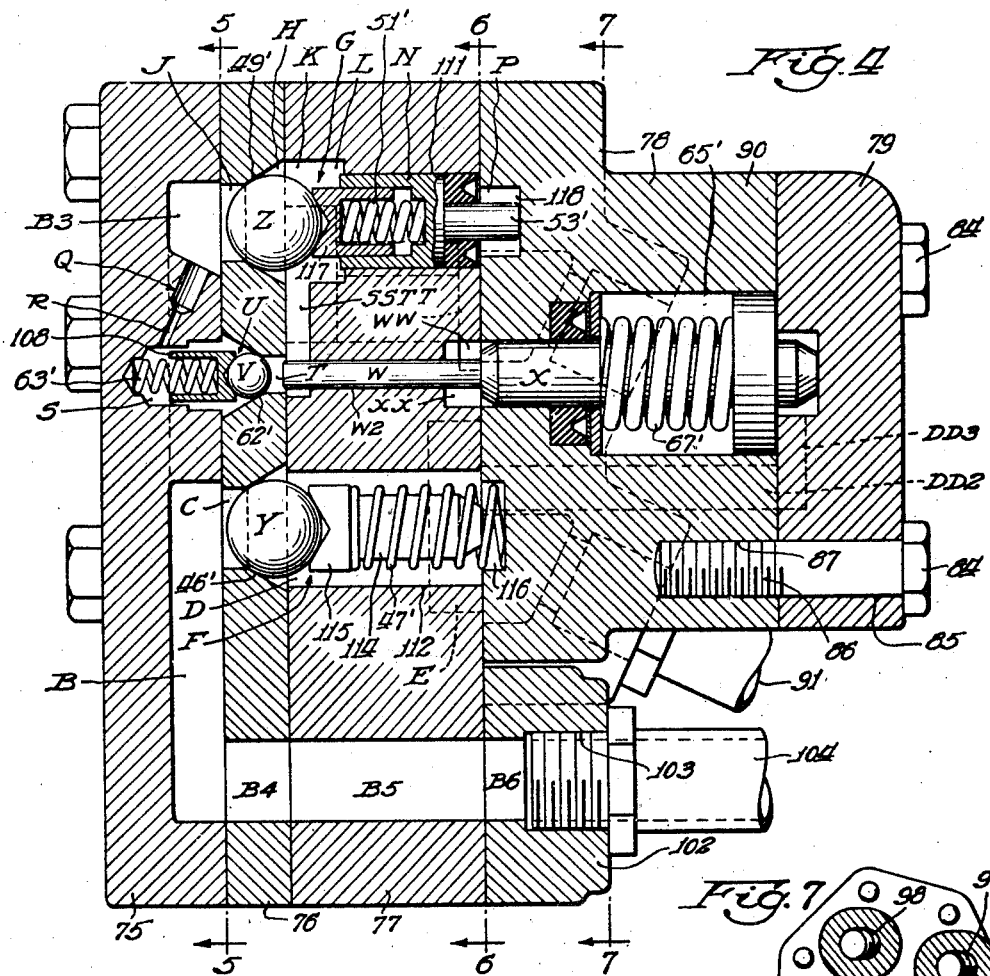
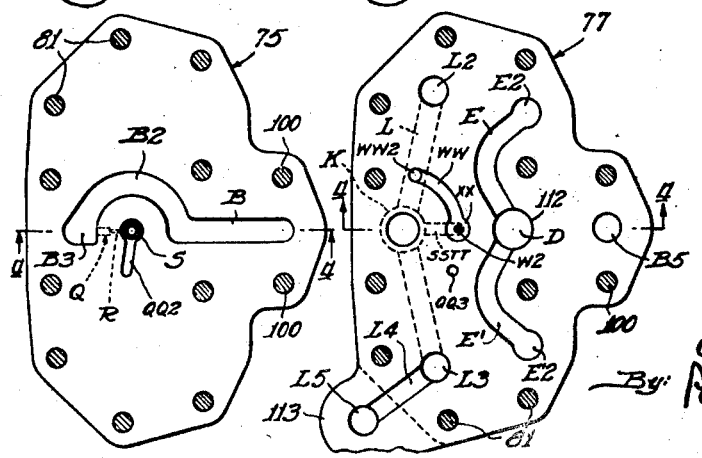
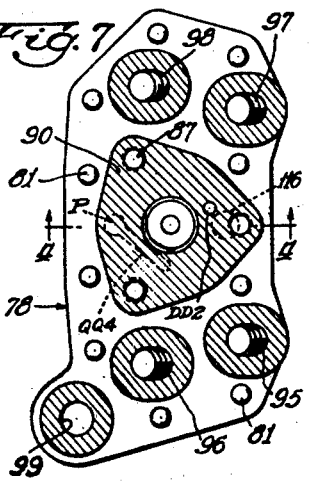
Inventor:
Carl W. Mott
By Paul O. Pippel
Atty.

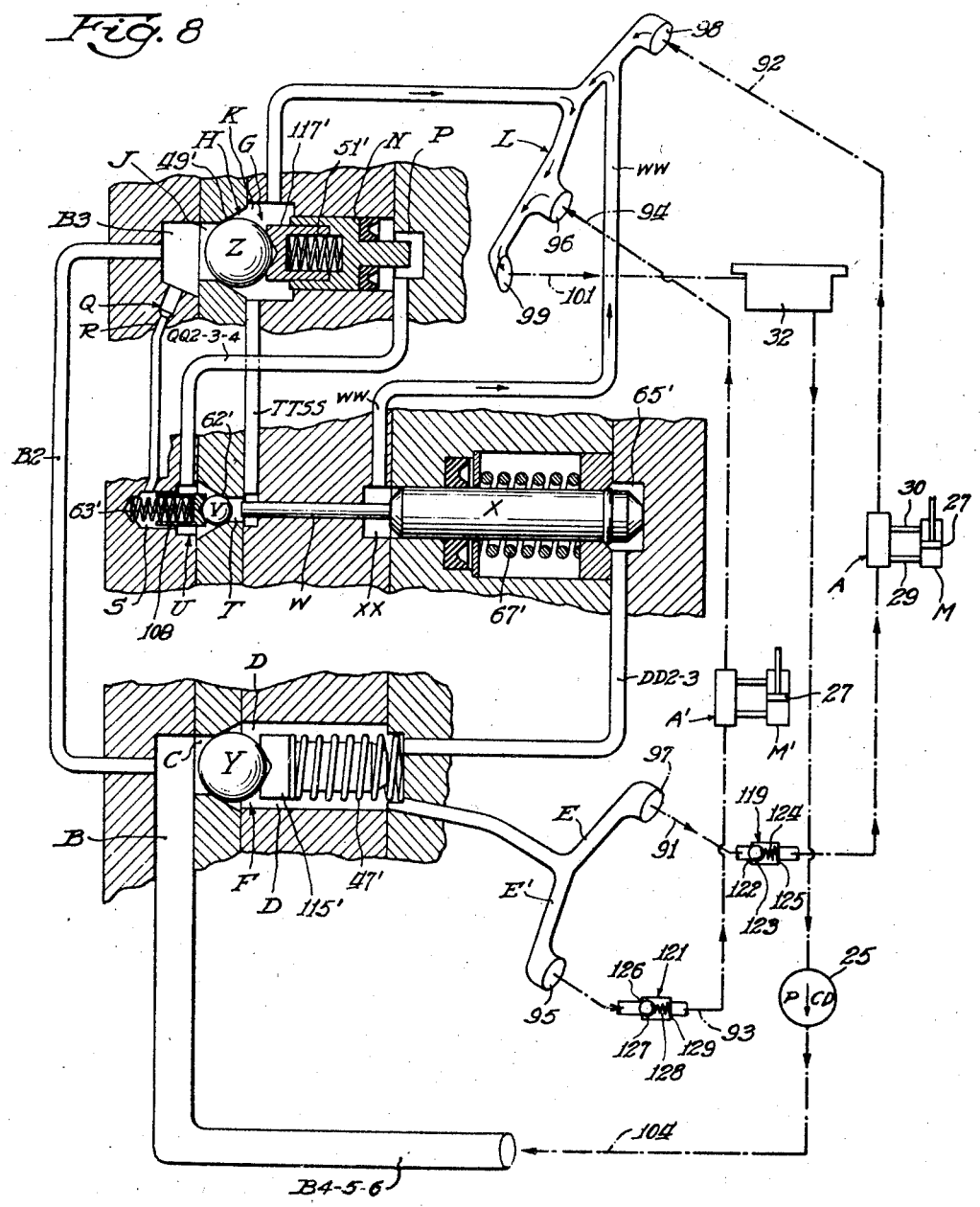

Inventor:
Carl W. Mott

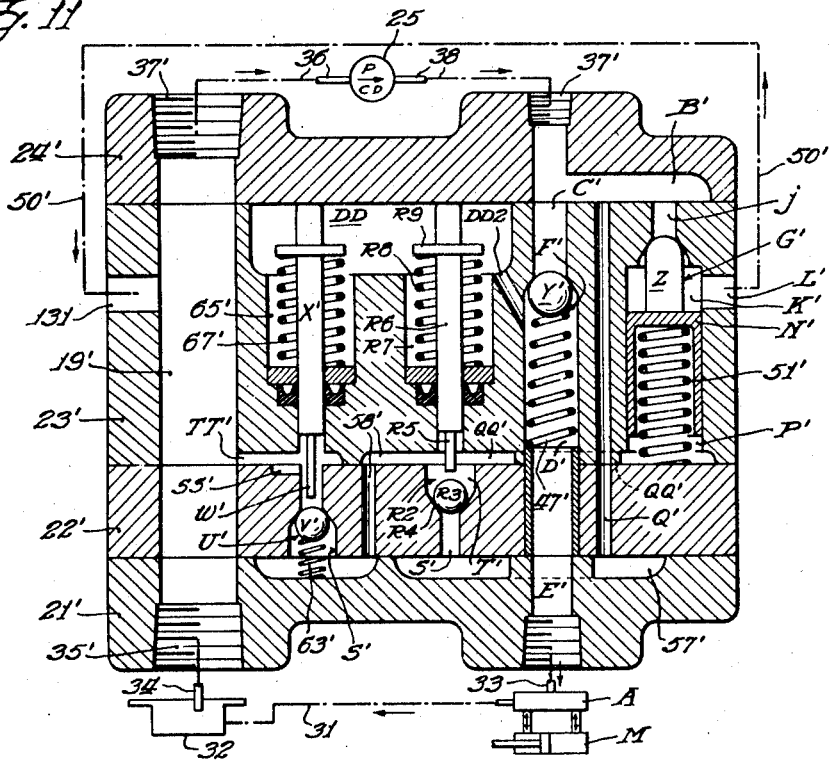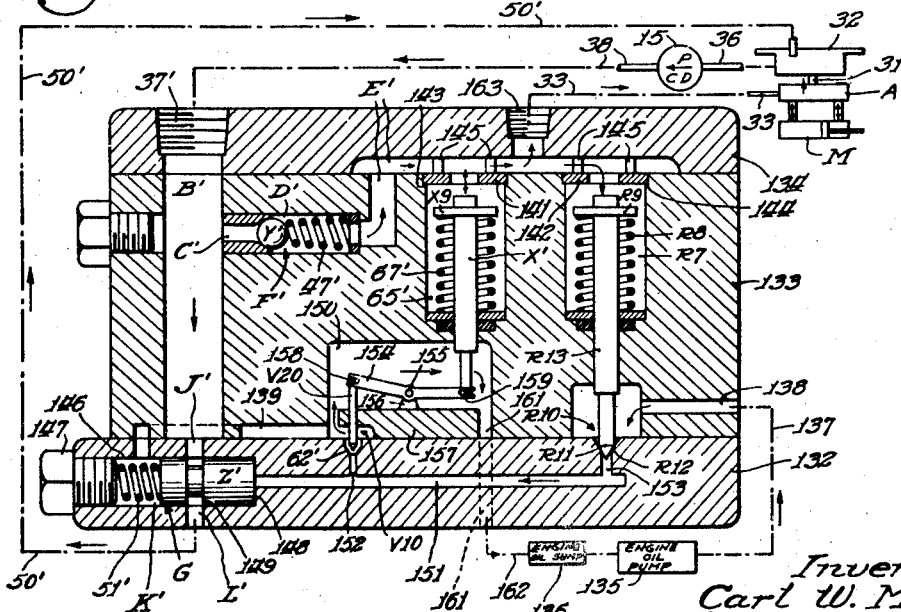

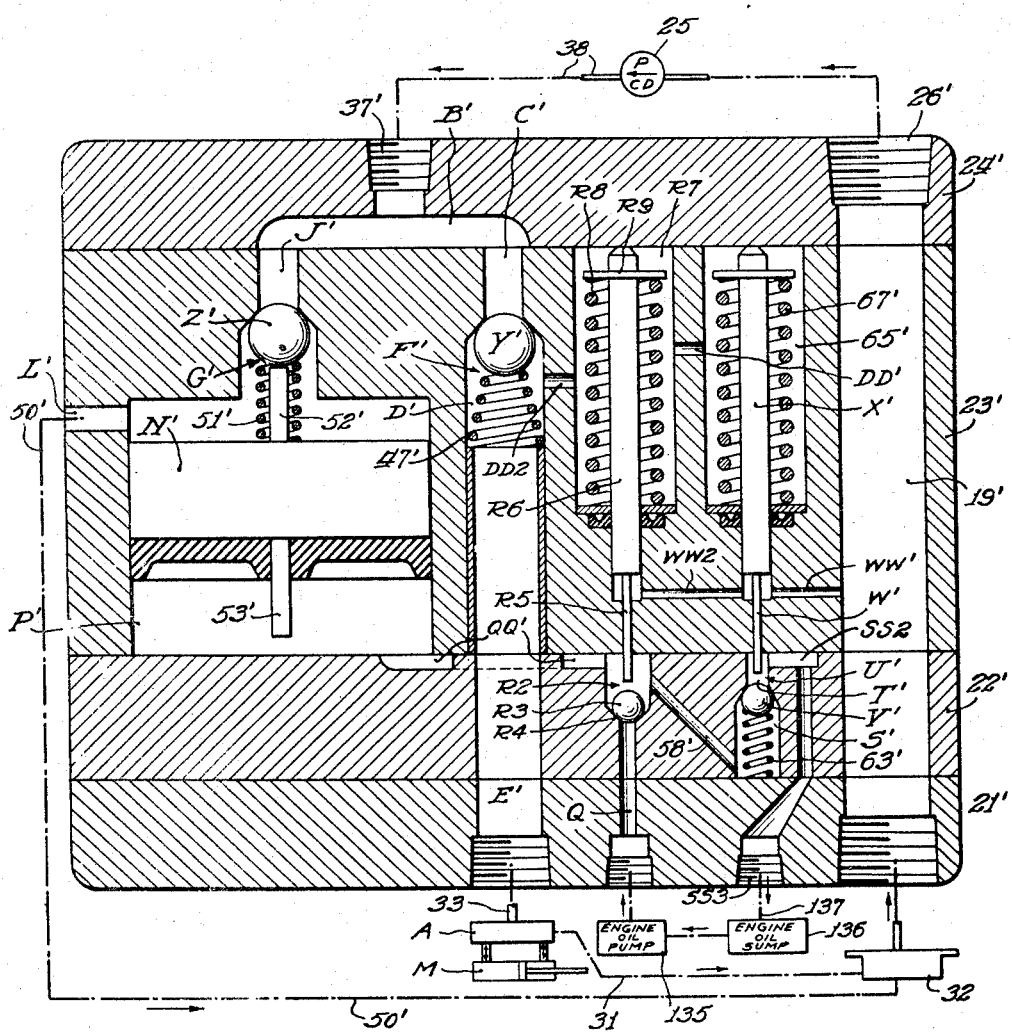

Patented May 13, 1947

2,420,554

UNITED STATES PATENT OFFICE 2,420,554

FLUID PRESSURE REGULATION AND CONTROL APPARATUS

Carl W. Mott, La Grange, Ill., assignor to International Harvester Company, a corporation of New Jersey Application May 12, 1943, Serial No. 486,656

10 Claims. (Cl. 277—53)

This invention relates to fluid-pressure regulation and control apparatus and has to do particularly with such an apparatus operable to effectuate and terminate delivery of fluid from a source to a place of discharge in accordance with the demand.

Apparatus constructed in accordance with the principles of this invention has special utility when interposed in the delivery line between a fluid-driven motor or the like and a constant delivery source of motor-propelling fluid, to establish a condition of high-pressure delivery between said source and motor during operating periods of the latter and to cause a low-pressure by-pass condition to prevail for the source during motor rest periods.

An important general object of the invention is the provision of a pressure regulation and control unit employable between a constant delivery source of motor-propelling fluid and a valve which controls admittance of the fluid to the motor and operable responsively to a diminished pressure incurred by the opening of the valve to direct the fluid from the source to the motor at a sufficiently high pressure to drive the same and operable responsively to an increased pressure incurred by the closing of said valve to establish a by-pass channel in circuit with the source delivery, whereby the source can continue its delivery relatively effortlessly without heating the fluid. Thus the unit is advantageously serviceable in a remotely controlled fluid-driven motor installation, since the supervisory control need manipulate only the fluid admittance valve for the motor while the unit automatically functions responsively to fluid-pressure changes concommitant to fluid delivery and cessation of such delivery to the motor, to respectively switch the source output to the motor and to by-pass. A constant delivery pump and motor set are thereby ideally governed with the simplest type of manual control which may extend to any desired point conveniently accessible to an operator.

Additional objects of the invention include the provision of:

A novel by-pass valve control responsive to fluid-pressure changes in a fluid delivery passage to determine the open or closed condition of the by-pass valve.

A unique by-pass valve operating assembly operable in opposition to pressure upon the valve, tending to by-pass the same, to close the valve by means of a superior force derivable from fluid at a unit pressure not necessarily exceeding that of the fluid tending to by-pass.

A by-pass valve control wherein the pressure of fluid within a fluid-receiving passage retains the by-pass valve closed and wherein a fluid-escape port for said passage is openable by advancing a valve member against the pressure in the passage wherefore, upon opening of the port and a consequent initial drop of pressure in the passage, the valve member is advanced quickly and decisively to open the port and so diminish the pressure in the channel that the by-pass valve opens.

An improved casing made up of a plurality of plate-like members wherein the various passages are formed by holes through these plates and open channels in the faces of some thereof converted into buried channels by the faces of adjacent members fitted thereonto.

A novel casing according to the next preceding object wherein holes through one of the plates are enlarged to form valve seats.

These and other desirable objects inherent to and encompassed by the invention will be more readily comprehendable upon reading the ensuing description with reference to the annexed drawings, wherein:

Fig. 1 is an end elevational view of one embodiment of the invention;

Fig. 2 is a fragmentary sectional view taken as indicated by the line 2—2 in Fig. 3, illustrating the manner in which securing bolts are inserted through the various plates of the unit for holding them in assembly;

Fig. 3 is a back side plan view taken as indicated by the line 3—3 in Fig. 1 and showing certain fluid-conducting passages in dotted outline;

Fig. 4 is a transverse sectional view taken through the unit through a central plane indicated by the line 4—4 in Figs. 3, 5, 6, and 7;

Fig. 5 is a plan view of one of the plates making up the fabricated casing of the unit and taken as indicated by the line 5—5 in Fig. 4;

Fig. 6 is a view similar to Fig. 5 but illustrating a face of another of the plates and taken upon the line 6—6 in Fig. 4;

Fig. 7 is a view taken on the line 7—7 of Fig. 4 illustrating another of the casing-forming plates of the device partly in plan and partly in section;

Fig. 8 is a view partly schematic and partly diagrammatic, illustrating the principal elements of the unit disclosed in the lower numbered figures and showing the structural interrelation and the functional cooperation of these elements;

Fig. 11 is a sectional view taken through another unit comprising the elements shown in Fig. 10 in a different spaced relation with respect to one another but in a functional interrelationship that is identical;

Fig. 12 is a sectional view taken through another embodiment of the invention; and Fig. 13 is a sectional view taken through a still further form of the invention.

Inasmuch as Fig. 9 contains the essential elements of that form of the invention shown in Figs. 1 to 9 and has been laid out with the view of plainly displaying these elements in their functional relationship to one another, this simplified illustration of the invention will first be described.

Figure 9:
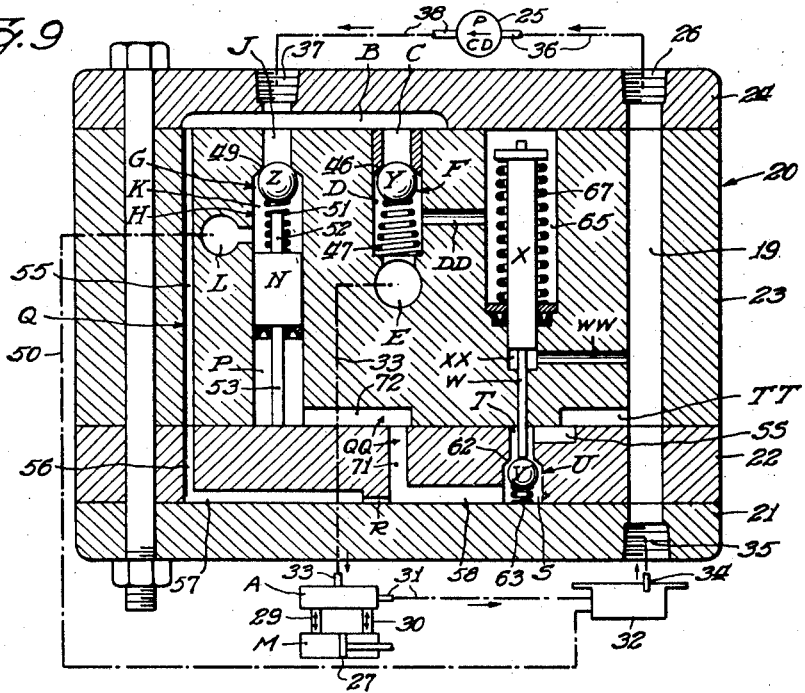
Fig. 9 is a sectional view taken through a unit employing elements corresponding to those illustrated in Figs. 1 to 8 and cooperating in the same manner, this view being laid out with the idea of exhibiting the various elements in such a manner that their functional cooperation is readily perceivable.

A casing 20 for the unit as illustrated in Fig. 9 comprises a plurality of plate-like members respectively designated 21, 22, 23, and 24. The unit is for controlling the delivery output of a constant delivery pump 25 from which the pumped fluid as oil is to be delivered to a fluid-driven motor M for propelling a work member in the form of a piston 27.

After passing through the casing 20 through a channel presently to be described, the pumped fluid enters a valve device A, which while shown diagrammatically to simplify the illustration actually contains parts which according to the selective setting of the valve enables it to cause the fluid introduced thereinto to be directed into either end of the motor M through conduits 29 and 30. Concurrently with a setting for directing the fluid into the motor through either of the conduits 29 or 30 said valve mechanism A will be concurrently set for receiving the fluid exhausted from the opposite end of the motor through the other conduit 30 or 29 and for directing this exhausted fluid outwardly of the valve device through a conduit 31 into a reservoir 32. Irrespective of the setting of the valve for directing fluid selectively into the ends of the motor M, such fluid is always introduced into the valve through a conduit 33, whereas the fluid exhausted from the motor is always discharged from the valve through the conduit 31.

A valve possessing the operating characteristics just explained with respect to the valve A is described in detail in my copending application Serial No. 466,463, filed November 21, 1942, for "Power adjusting mechanism."

The constant delivery pump 25 obtains fluid from the reservoir 32 through a conduit 34 of which one end is connected to a threaded port 35 at one end of a passage 19 which traverses all the plates in the casing 20. Fluid passing into the passage or channel 19 is conducted to the pump through a conduit 36, which has one end in threaded engagement with a threaded port 26 at the other end of said passage 19. The flow is in the direction indicated by the arrows. Fluid discharged from the pump 25 reaches a threaded port 37 in the casing 20 through a conduit 38, and from this port the fluid is delivered to the conduit 33 through fluid-conducting passage portions B, C, D, and E. A check-valve F, consisting of a check-valve ball Y, a seat 46, and a spring 47 for urging the ball against said seat, permits the flow of fluid in the direction to reach the motor from the pump while checking the flow in the opposite direction. In other words, the check-valve F divides the fluid-conducting channel into an inlet portion C and a discharge portion D.

It should also be explained that the valve device A is settable so that fluid in the conduit 33 is prevented from flowing into either end of the motor M. Under these circumstances it is essential that the fluid from the constant delivery pump be allowed to escape elsewhere, and to accommodate this particular phase in the operation of the apparatus, a by-pass valve G is provided. The by-pass valve G is disposed within a by-pass passage H containing portions J, K, and L through which the fluid is successively by-passed. The passage portion L communicates with the reservoir 32 through a by-pass conduit 50. Said by-pass valve includes a valve member in the form of a ball Z and a valve seat 49 against which the ball is adapted to be seated by a spring 51. Under those conditions, when fluid is being delivered to the motor under pressure, as will presently be explained, a piston member N against which the spring 51 reacts is moved upwardly under the force of fluid within a chamber portion P, incident to compressing said spring 51 and pressing the upper end of a valve stem 52 against the ball Z for forcibly seating it against the seat 49 to prevent by-pass. In the by-pass position illustrated, a stem 53 on the lower end of the piston N rests upon the bottom of the chamber P to limit the downward movement of said piston under the reactive force of the spring 51 and to thereby predetermine the force with which the spring urges the ball toward the seat 49 and the relatively low pressure at which the fluid can by-pass the ball while forcing it off of the seat.

A fluid-receiving passage Q includes a vertical portion 55 in the comparatively thick, plate-like member 23, portions 56 and 57 in the plate 22 (the latter portion being an open channel closed by the plate 21), a restricting portion R, portions 58, S, T, and SS also in the plate 22, and a portion TT in the lower face of the plate-like member 23. The passage portions S and T are separated by a control valve U including a valve member in the form of a ball V, which is normally urged onto a seat 62 therefor by a spring 63. In the particular operating cycle in which the apparatus is shown, however, a valve stem W holds the valve member V unseated, so that there is movement of the fluid through the passage Q from the passage portion B through the restriction portion R and past the ball valve member V to the low-pressure passage 19. As explained above, the parts of the apparatus are illustrated in Fig. 9 in the positions they occupy while the apparatus is set for by-passing the fluid delivered by the constant delivery pump 25. During this by-pass phase of the operating cycle, the valve A will be closed to prevent ingress or egress of fluid to either end of the motor and to prevent the escape of fluid from the lower end of the conduit 33. The fluid within the conduit 33, the passage E, and the fluid-conducting portion D will be under a relatively high pressure which is preserved by the check-valve member Y. Such high pressure in the fluid-conducting portion D will coexist within a valve chamber 65 into which fluid is introduced from the passage portion D through a cross channel DD. Fluid at this high pressure in the chamber 65 exerts a downward pressure upon the piston-like valve stem member X for pressing the lower end of the valve stem W on the valve member V for holding this latter member in the unseated position illustrated. A spring 67 tends to lift the valve-operating member X to permit the valve member V to seat under the force of its spring 63 so that upon reduction of the pressure within the chamber 65, as hereinafter explained, the passage Q will be closed by the valve member V. A vent passage WW connects a lower end portion XX of the chamber 65 with the low-pressure passage 19 to prevent the accumulation of fluid which may leak downwardly between the member X and the side walls of said chamber portion XX, whereby the vertical adjustment of said member X will not be interfered with.

It should be noted that channel portions 71 and 72 formed respectively in the plate 22 and the plate-like member 23 form a lateral QQ connecting the lower end of the chamber P with a section of the passage Q which is between the restricted passage portion R and the valve U. It should be further noted that the section 58 of the passage Q and the lateral channel sections 71 and 72 are of transverse section sufficiently large that their flow capacity exceeds that of the restricted channel section R, whereby when the valve U is open the fluid can escape from the lower end of the chamber P through the passage or channel sections 72, 71, 58, S, T, SS, and TT into the low-pressure part of the system at a greater rate than fluid is introduced into the channel section 58 through the restricted section R. Therefore, while the valve U is open, the pressure of fluid in the passage section 58 will be relatively low so that fluid in the chamber P can escape to allow the piston-like valve-operating member N to rest upon its stem extension 53 at the bottom of the chamber P so that the check-valve G will be conditioned for by-pass.

Operation of the apparatus shown in Fig. 9:

While the apparatus of Fig. 9 is in the by-pass condition there illustrated, the valve A is closed, and this valve together with the check-valve F are thus operated for trapping within the passage D and in the chamber 65 fluid at sufficient pressure for forcing the valve-operating member X downwardly against the force of the spring 67, thereby holding the control valve member V in its open position. While the valve U is thus opened, the fluid from the chamber P can escape through the channel sections 72, 71, 58, S, T, SS, and TT to the low-pressure side of the system. The channel sections 58, SS, and TT and the valve U have sufficient flow capacity for discharging the fluid sufficiently fast to prevent the building up in the chamber P any sufficient amount of pressure, because of fluid directed into the passage section 58 through the restricted section R. Therefore, the valve stem 53 will be allowed to rest upon the bottom of the valve chamber P and the by-pass valve G conditioned for by-pass.

It will be assumed that the pressure of the fluid within the chamber 65 and the fluid-conducting passage portion D is something over 700 pounds per square inch. This relatively high pressure is extended to the valve A through the conduit 33, whereby operating fluid for the motor M and at sufficient pressure for operating the same under normal conditions will be on tap in close proximity thereto for instant operation thereof. When it is desired to cause the motor M to operate, the valve A will be set (by means not shown) to cause communication between the conduit 33 and one end of said motor and concurrent communication between the opposite end of the motor and the conduit 31 which leads to the reservoir 32. Upon this setting of the valve and the consequent initial movement of the work member 27 of the motor under the pressure of the fluid imposed thereon, there will be a reduction of pressure in the conduit 33, the passage portion D, and in the valve chamber 65. When this pressure drops to a predetermined minimum, say 700 pounds, the spring 67 will be effective for lifting the valve stem W and allowing the control valve U to close under the force of its spring 63.

Subsequent to the closing of the control valve U, fluid from the source continues to flow inwardly of the apparatus through the channel Q and through the restricted section R of the channel Q into the channel sections 58, 71, and 72 and into the lower part of the by-pass valve chamber P. As this fluid accumulates its pressure increases, lifting the valve control member N and its upwardly extending stem 52 for pressing the latter against the valve member Z and forcibly seating this valve member upon the seat 49 to prevent by-pass. Prior to this seating of the valve member Z, the fluid from the constant delivery pump 25 by-passed the member Z and flowed downwardly through the channel section K and thence outwardly through the channel L and the conduit 50 to the reservoir 32. During by-pass, the spring 51 urges the valve member Z toward the seated position with a nominal force sufficient, for example, to incur a fluid pressure of 70 pounds within the channel B.

After the closing of the by-pass valve, the fluid from the pump will quickly accumulate in the passage portions B and C and ultimately reach a pressure sufficient to unseat the check-valve member Y and continue to flow through the fluid-conducting channel portions B, C, and D, the conduit 33, and the valve A to the motor for causing movement of the work member 27, so long as the valve A remains open. It should be noted that the by-pass valve G will remain closed irrespective of the amount of pressure developed within the passage portions B and J, since the area of the lower end of the valve-operating member N exceeds the area which the valve member Z presents to the fluid tending to escape downwardly through said channel portion J. The same unit pressure will be applied downwardly upon the by-pass valve member Z as is applied upwardly upon the lower end of the valve-operating member N, wherefore the upward force exerted by the fluid of said member N will exceed the downward force upon the valve member Z, the member N remaining the boss irrespective of the magnitudes of these equal unit pressures.

So long as the valve A is maintained in the open position for causing fluid delivery to a portion of the motor M, the dissipation of the fluid from the channel portion D downwardly through the conduit 33 to the motor will limit the pressure attained within said channel portion D and the valve chamber 65. However, upon the valve A being closed for stopping the motor after it has operated the desired amount, the delivery of fluid into the channel portion D from the constant delivery pump will very quickly build the pressure up in the valve chamber 65, and upon this pressure reaching a predetermined maximum, say 900 pounds per square inch, the valve-operating member X will be forced downwardly for opening the control valve U and reestablishing the above described by-passed condition. While this description of the sequence of the operation of the various parts of the apparatus necessarily requires considerable space, the speed of operation of the parts is very fast, making their operating cycle almost instantaneous.

Attention is particularly directed to the fact that the downward movement of the valve control member X, in addition to being resisted by the springs 67 and 63, is also resisted by the pressure of fluid within the channel portion S pressing upwardly upon the valve member V. The unit pressure of the fluid in channel portion S will be equal to the unit pressure within the valve chamber 65 acting downwardly upon the control valve member X, so that it is because of the larger area upon the upper end of the member X as compared to the area upon the valve member V reacted upon by the fluid in the channel portion S that the total fluid-pressure force exerted upon the member X exceeds the aforesaid three force components for ultimately opening the valve U. When the force urging the control valve member X downwardly attains sufficient magnitude (at about 900 pounds per square inch of the fluid in the chamber 65) to predominate over the three force components and slightly "crack" the valve U, fluid will begin to escape past the valve member V, reducing the fluid pressure in the channel portion S, thereby diminishing the opposing force being due to the pressure of fluid in the channel portion S and enabling the fluid-pressure force supplied to the member X to quickly prevail over the other two opposing forces being exerted by the springs 63 and 67. This opening of the port in the valve seat 62, by moving the valve member V inwardly of the passage portion S against the pressure of fluid therein, provides for the building up of a potential pressure increment within the chamber 65 and a corresponding potential increment of force applied downwardly upon the control valve member X for popping the valve U into the open position following an initial partial opening of the valve. The opening of the valve U is, therefore, complete and decisive. The wiredrawing and consequent heating of the fluid discharged through the valves U and G, while the apparatus is operating in the by-pass condition, is thereby avoided.

That form of the invention just described with reference to Fig. 9 will now be described in Figs. 1 to 8, inclusive, wherein the essential elements are shown in a different physical relation and in a different type of casing which lends itself to a more expedient and economical manufacturing process. The letter reference characters employed in Figs. 1 to 8 have a dual significance; that is, in addition to the role of reference characters, they further signify elements which correspond to those designated by the same letter reference characters in the embodiment in Fig. 9. In some instances the reference characters will contain a digit as well as a letter, and the latter component of this type of reference character signifies the fact of a relation between the designated element and the element identified by the same reference character in Fig. 9. Reference characters including a prime exponent correspond to the elements in Fig. 9 identified by the same reference characters without the prime exponent.

Referring now to Figs. 1 to 8 and particularly to Figs. 1 and 4, the casing for the device will be seen to be a laminated structure comprising a plurality of plates respectively designated 75, 76, 77, 78, and 79. Plate 75 is regarded as the back plate and plate 79 as the front plate wherefore each plate has a reverse and an obverse face. Both faces of the plates 76, 77, and 78 are flat and smooth, facilitating their assembly together in a closely fitted, fluid-tight assembly. The obverse face of the back plate 75 is flat and smooth, facilitating being fitted flatly and in sealed relation with the reverse face of the plate 76. A like fitted and sealed relation exists between the reverse face of the plate 79 and the obverse face of the plate 78. A plurality of bolts 81 are inserted from back to front through suitable apertures therefor in the plates 75 to 78, and front end portions of the shanks upon these bolts are threaded, as indicated at 82 in Fig. 2, and turned into meshed relation with respective threaded apertures 83 in the plate 78. The plate 79 is held in assembly with the plate 78 by three bolts 84 having unthreaded portions of their shanks extending backwardly through openings 85 in the plate 79 and threaded portions 86 of those shanks turned into meshed relation with the threads in threaded recesses 87 in the plate 78. While not illustrated, it is comprehensible that gaskets or similar sealing means may be employed between the opposed adjacent faces of the plates making up the casing of the device.

It should be explained that the arrangement now being described differs from that in Fig. 9 insofar as it is designed with outlets and inlets for the accommodation of two fluid-driven motors of which the operation is to be controlled by fluid carried through the device. Only one motor (M) is shown in connection with the device of Fig. 9. An outlet conduit 93 and an inlet conduit 94 are provided respectively for the delivery and exhaust of one motor M'. These conduits 93 and 94 are shown at one side of a projecting portion 90 of the plate 78 in Fig. 1. A second pair of conduits, designated 91 and 92 and shown schematically in Fig. 8, consists of inlet and outlet conduits for a second motor M also shown in Fig. 8, and while these conduits 91 and 92 are not shown in Fig. 1, they are arranged symmetrically of conduits 93 and 94 on the opposite side of the aforesaid projection 90 of the plate 18. An idea of the arrangement of the conduits 91, 92, 93, and 94 can be gained from Fig. 7, where threaded ports 95 and 96 are shown for the attachment of the conduits 93 and 94 to the device, and corresponding threaded ports 97 and 98 are shown for the conduits 91 and 92. In addition to the pairs of inlet and outlet ports 91 and 92 and 93 and 94 upon the front face of the plate 78, there is also an exhaust port 99 for the device through which fluid delivered to the device through the ports 95 and 96 from the exhaust sides of the motors is dischargeable into the reservoir 32. A conduit indicated at 101 in Fig. 1 is for conducting the fluid from the device to the reservoir. An auxiliary plate 102, Figs. 1 and 4, is secured to the obverse face of the plate 77 by bolts 100 (similar to the bolts 81) similarly to and immediately below a central section of the plate 78. This plate 102 contains a threaded port 103 for receiving fluid from the pump into the device through an inlet conduit 104. From this brief introductory description of the device, it can be ascertained that all the conduits for carrying fluid to and from the device are connected therewith at the front side thereof. Apertured ears 105 and 106 are formed integral with opposite ends of the plate 77 to provide for connection of the device with any type of suitable support means which is generally designated 107 in Fig. 3.

Referring now particularly to Figs. 4 and 5, the obverse face of the plate 75 will be seen to have an open channel B having a curved portion B2 and an extended portion B3. The lower end of the channel B is viewed in Fig. 4, and its right end, as viewed in Fig. 5, communicates with the inlet port 103 by channel portions B4, B5, and B6 formed by axially alined holes respectively in the plates 76, 77, and 102. There is also formed in the obverse face of the plate 75 a recess constituting a passage portion S. Passage portion S communicates with the extended portion B3 of the open channel B through a channel Q and a restricted portion R of said channel.

The casing plate 76 constitutes a valve seat plate having a plurality of openings in which valve seats are respectively formed for spherical valve members V, Y, and Z. In Fig. 4 it can be seen that the seats 49' and 46' for the valve members or balls Z and Y are formed by enlarging the valve plate openings at the obverse face ends of these openings, and that the valve seat 62' for the valve ball V is formed by enlarging the reverse face end of the third of these openings shown in Fig. 4.

The valve ball V is urged into seated relation with its cooperating seat 62' by a spring 63' which reacts between the plate 75 and a hollow ball carrier member 108 which is smaller in diameter than the channel portion S so that communication prevails between the channel portion S and the valve seat 62'. The valve member V constitutes a portion of the control valve U.

Valve members Z and Y constitute components of the by-pass valve G and the check-valve F, and the springs 51' and 47' for these valves are contained within the casing plate 77. The reverse face of said plate 77 is traversed by a transverse open channel L of which the position is best conceived by concurrent examination of Figs. 4 and 6. This channel L constitutes a by-pass passage for conducting fluid from the device for discharge into the reservoir which is shown schematically in Fig. 8 where it is designated 32. Holes L2 and L3 communicate between opposite ends of the channel L and the obverse face of the plate 77. A channel L4 in the obverse face of said plate, Fig. 6, extends between an obverse face end portion of the hole L3 and an enlargement L5 at the extended end of the channel L4. This enlargement L5 of the channel L4 is within a projecting portion 113 of the plate 77. The hole L2 registers with the port 98 in the plate 78 for receiving through this port 98 the exhausted fluid discharged from the motor M, Fig. 8, and this fluid is conducted through the channel L (downwardly as viewed in Fig. 6) past the by-pass channel portion K, thence forwardly through the opening L3, thence through the channel L4 and its enlargement L5, forwardly through the exhaust port 99 in the plate 78 which port registers with the enlargement L5, and thence to the reservoir 32 through the conduit 101, Figs. 1 and 8. Fluid exhausted from the motor M' reaches the port 96, Figs. 7 and 8, through the conduit 94 and enters the channel L4 through the hole L3, Fig. 6, which registers with the port 96, and this fluid thus reaching the channel L4 is discharged to the reservoir 32 through the channel enlargement L5, port 99, and the conduit 101, as just described with respect to the fluid exhausted from the motor M. Plate 77 also contains channel means SSTT corresponding to the control fluid escape channel portions SS and TT in Fig. 9, said channel means being in the form of an open channel within the reverse face of the plate in communication between the escape channel portion T, Fig. 4, and the by-pass channel L. A hole W2 extends through the plate 77 between the channel SSTT and a bottom portion XX (in the form of a recess) for the chamber 65', Figs. 6 and 4. However, the hole W2 does not intercommunicate between the channel SSTT and the chamber bottom portion XX, since said hole is filled by the valve stem W which is slidably contained therein. Said bottom portion XX of the chamber 65' communicates by an open channel WW with a hole WW2 which in turn communicates with the by-pass passage L. Thus any fluid escaping by the valve operating member X into the chamber portion XX can escape through the channel WW and the hole WW2 into the low-pressure by-pass passage L.

The passage portion D of the fluid-conducting passage for the conduction of fluid through the device for delivery to the motors M and M' includes a hole 112 through the plate 77. Channel portions E and E' in the obverse face of the plate 77 extend in opposite directions from an obverse face end portion of said hole 112 in general parallelism with the above by-pass passage L but, of course, on the opposite face of the plate 77 from said by-pass passage. Channels E and E' like the channels WW and L4 are converted into buried channels by the plate 78, when the latter is placed upon the obverse face of the plate 77. Fluid directed inwardly of the device past the check-valve F and the passage portion D flows through the channel E and the port 97, Figs. 7 and 8, which port is in registry with the enlarged end E2 of the channel E. This fluid which is discharged through the port 97 reaches the motor M through the conduit 91 and the valve A. Fluid flowing downwardly, Fig. 6, from the channel portion D through the channel E' and its enlarged end E'2 which is in registry with the port 95, Figs. 7 and 8, passes outwardly through this port and thence through the conduit 93 and the valve A' to the motor M'.

Referring now to the check-valve and by-pass valve structures F and G, the former includes, in addition to the valve member Y, a follower member 114 having a head 115 which is constantly pressed against the member Y by a spring 47' which has an end reactively seated in a shallow recess 116 in the reverse face of the plate 78. The by-pass valve G includes a follower member 117 of hollow cylindrical form which is pressed at all times against the valve member Z by a spring 51'. This follower member 117 is telescopically contained within a hollow piston member N which has a stem 53' which is abuttable reactively against the bottom of the chamber P which is formed by a shallow recess 118 in the reverse face of the plate 78.

Channel means for introducing fluid into the chamber portion P corresponding to the channel means QQ in Fig. 9 includes an open channel QQ2 in the obverse face of the plate 75, Fig. 5, a hole QQ3 extending through the plate 77 and which registers with the lower end of the channel QQ2, and a channel QQ4, Fig. 7, in the reverse face of the plate 78, the lowermost end of the open channel QQ4 registering with the obverse face end of the hole QQ3 and the uppermost end of the channel QQ4, as shown in Fig. 7, communicating with the chamber P.

Each of the fluid delivery channels E and E' communicates with its valve as A through a check-valve, which are shown in the conduits 91 and 93 at 119 and 121 in Fig. 8. Check-valve 119 includes a ball seat 122 against which a ball 123 is urged by a spring 124 which reacts against an abutment member 125 within its valve casing. A similar check-valve ball seat 126, ball 127, spring 128, and reaction member 129 for the spring 128 are employed in the check-valve structure 121. Each of the check-valves permits the egress of fluid outwardly through the channels E and E' but prevents reverse flow through these channels inwardly of the device. These check-valves are for preventing displacement of the motor work members 27, should a force be applied thereto when both of the valves A and A' are manipulated to an open position while the apparatus including the pump 25 is at rest. For example, upon referring to Fig. 8, it can be seen that the motors M and M' are intercommunicative through the valve A, conduit 91, channels E and E', conduit 93, and valve A'. Assuming the pump 25 to be at rest and the check-valve Y to be seated in the closed position, should the valves A and A' be thrown to the open position while forces not equal and opposite are applied to the work members 27 of the motors M and M', the column of fluid within the just-traced circuit connecting these motors would be movable under the predominating force applied to the work members allowing their displacement. Under certain circumstances, if it were not for the check-valves 119 and 121, this displacement of the work members might be inadvertently incurred disadvantageously. One installation of the apparatus in which it would be undesirable for inadvertent movement of the work members 27 to occur would be one in which the motors M are used for controlling the elevation of tillage tools at opposite sides of a tractor. It will be understood that motors as M and M' can be employed for controlling the depth of these tools by forcing them into the ground a desired amount or by holding the tools in opposition to the draft force tending to "suck" them into the soil. Also, these motors in an installation of this kind may be utilized for raising the tillage tools from their earth-working position to a transport position, and, while the tools are so maintained in the transport position, they will exert a reactive force downwardly by the force of gravity tending to move their respectively associated work members 27 toward one end or the other of the motor cylinder. Perhaps one of the tools would be in the transport position while the other was in the earth-working position, so that under this situation, while the pump 25 is at rest, should the valves A and A' be inadvertently simultaneously opened, the force exerted upon the work member of the motor associated with the raised tool would descend while exerting a force through the interconnecting fluid column for moving the work member in the other motor for lifting the one tool from the earth-working position. In other words, the column of fluid interconnecting the motor serves as a differential connection between the motor work members, and should one of the tools be allowed to descend in the aforedescribed manner, it might strike and injure an attendant who might have some part of his body beneath it.

Channel means within the casing of the device that corresponds to the channel DD in Fig. 9 for conducting pressure fluid into the valve chamber 65, Fig. 9, is provided by a hole DD2 in the plate 78, Figs. 4 and 7, and an open channel DD3 in the reverse face of the plate 79. The outline of the hole DD2 and of the channel DD3 are shown in Fig. 4 by dotted lines.

*Operation of the structure shown in Figs. 1 to 8*

The operation of the structure of which the details are shown in Figs. 1 to 7 will be described with particular reference to Fig. 8, wherein some of the fluid-conducting channels are illustrated diagrammatically to more clearly show their connection between other channel portions of the apparatus. Fig. 8 also diagrammatically shows a pair of motors selectively operable by fluid delivered through the apparatus, as well as a fluid reservoir for receiving the fluid exhaust from the motors, valves for respectively controlling the flow of fluid to the motors, a pump for drawing fluid from the reservoir for delivery to the apparatus under pressure, and diagrammatically illustrated conduits connecting the pump, motors, valves, and reservoir with the apparatus.

The apparatus, as shown in Fig. 8, is conditioned for delivering fluid from the pump 25 to one of the motors under pressure for driving the same. It will be assumed that the valve A has been manually opened to permit the flow of fluid into the motor M for advancing its work member 27. Upon the initial opening of the valve A, the fluid pressure within the chamber 65' for the valve operating member X was allowed to diminish, this being because of the connection through the channel portions DD2—3, (diagrammatically shown in Fig. 8 but representative of the passage portions DD2 and DD3 which are shown in Figs. 3, 4, and 7) fluid-conducting portion D, channel E, port 97, conduit 91, and the valve A to the motor. The pressure is relieved upon expansion of the motor, that is, movement of the work member 27 under the force of the fluid within the just traced channels. Upon this reduction of the pressure in the chamber 65', the spring 67' forces the valve operating member X and its stem W away from the valve member V, permitting the spring 63' of the control valve U to seat the valve member V. When this occurs, the fluid delivered from the constant delivery pump 25 inwardly of the device through the conduit 104, channel portion B4—5—6 (which is a schematic representation of the holes B4, B5, and B6 in the plates 76, 77, and 102 in Fig. 4), channel portions B, B2, B3, and the control channel Q can no longer escape past the valve member V and the channel portions T and TTSS to the by-pass passage H and thus outwardly of the device or apparatus through the channel L and port 99 to the reservoir 32. Consequently, the fluid passing through the restricted passage portion R of the control passage Q will be forced under a high pressure into the chamber P for the control member N of the by-pass valve G, said fluid reaching the chamber P through the channel QQ2—3—4, which diagrammatically represents the channel portions QQ2, QQ3, and QQ4 shown in Figs. 5, 6, and 7. As a consequence of this pressure in the chamber P, the piston-like control member N is forced toward the valve member Z for positively holding said valve member upon its seat 49' and thus checking the flow of fluid past the by-pass valve G from the by-pass passage portion J into the by-pass passage portion K. Therefore, the constant delivery pump will cause a high pressure to be built up in the channel portions B, B2, and B3 a sufficient magnitude to unseat the check-valve member Y and cause the delivery of fluid from the pump through the channel portion B, the fluid-conducting channel portions C and D, channel E, port 97, conduit 91, and the valve A to the motor M for driving the same so long as the valve A remains open. Also the motor will be driven at a speed depending upon the degree to which the valve A is open.

While the motor is receiving driving fluid from the valve A through one of the conduits 29 or 30, the fluid will be exhausted or expelled from the motor through the conduit 92, port 98 of the apparatus, channel L, port 99, and the conduit 101 into the reservoir 32.

After the work member 27 of the motor M has been propelled the desired distance, the valve A will be closed, thereby preventing communication of either conduit 29 and 30 with the conduits 91 and 92, whereby the fluid locked in the motor on opposite sides of the work member 27 will retain it in the desired position to which it has been advanced. Such closing of the valve A prevents the further discharge of fluid from the conduit 91, whereby fluid from the constant delivery pump past the check-valve F is caused to quickly build up the pressure in the valve operating member receiving chamber 65', compressing the spring 67' incident to advancing of the valve control member X and its stem W for opening the control valve U. When the valve U opens, the by-pass condition of the apparatus is established, since at this time the fluid under pressure in the by-pass valve chamber P can escape through the diagrammatically represented passage QQ2—3—4, past the valve member V, through the channel portions T and TTSS into the by-pass channel H, and thence outwardly through the channel L, port 99, and conduit 101 to the reservoir 32, allowing the by-pass valve member N to retract and permit the valve member Z to unseat for by-passing the fluid delivered by the pump instead of causing this fluid to be forced past the check-valve F.

As explained hereinabove in the description of the operation of that arrangement disclosed in Fig. 9, this opening of the valve U involves the movement of the valve member V from its seat 62' against the pressure of fluid within the channel portion S, which fluid pressure is the source of a force component acting directly and complementally with the components of force exerted by the springs 63' and 67' in resisting movement of the valve control member X for unseating the valve member V, and as explained in the aforesaid description of the operation of the Fig. 9 disclosure this force component derived from the fluid pressure in the channel portion S vanishes following the "crack" of the valve U, which permits the escape of fluid past the valve from such channel portion S, wherefore the potential force developed in the chamber 65' for overcoming the initial force derived from the pressure in the channel portion S, together with the force components derived from the springs 63' and 67', is allowed to suddenly predominate for quickly and precisely opening the valve U. This function of the channel portion S in collecting fluid under pressure for applying a force component initially opposing opening of the valve U for setting the apparatus in the by-pass condition following the closing of the valve A when the motor M is operated the desired amount, causes the apparatus to possess that operating characteristic wherein there is a difference between the pressures at which the apparatus is "tripped" to the by-pass condition and at which it is "tripped" to the fluid delivery condition for delivering fluid from the pump to the motor; that is, no fluid pressure force component is involved in the closing of the valve U under the force of the springs 63' and 67' for "tripping" the apparatus into fluid delivery condition upon the opening of the valve A and the consequent diminution of pressure in the chamber 65' containing the valve control member X. Therefore, the springs 63' and 67' may cause the valve U to close upon the existence of a pressure of say 700 pounds per square inch in the chamber 65', and these springs, together with the force derived of the fluid in the channel portion S, will be operable to prevent opening of the control valve U until such time as a pressure of say 900 pounds is created in the channel 65'. This difference between the opening and closing pressures of the fluid in the chamber 65' for controlling the opening and closing of the control valve U assures that after the valve U is closed for causing delivery from the pump through the check-valve Y to the motor, the motor can be operated at a slow speed for a longer period without the excess delivery of the pump with respect to the consumption rate of the motor building up the pressure within the chamber 65' at an undesired rapidity for opening the valve U and creating the by-pass condition of the apparatus. Should control valve U be thus opened and closed rapidly during slow operation of the motor M, an objectionable clicking noise and undesirable and unnecessary wear would occur upon the parts.

While the operation of the apparatus has just been described with respect to the valve A and motor M in Fig. 8, it should be understood that a like operation of the apparatus will be incurred by the operation of the valve A' and motor M', the only difference being that the fluid discharged from the apparatus past the check-valve F will be delivered through the channel E' instead of the channel E and past the check-valve 121 and through the port 95 and the conduit 93 to the valve A' and the motor M' instead of past the check-valve 119 and through the port 97, the conduit 91, and the valve A to the motor M. Moreover, the discharge of fluid from the motor M' through the valve A' will be through the conduit 94 and enter the device through the port 96 instead of through the port 98 for delivery through the channel L, port 99, and conduit 101 to the reservoir 32.

Figure 10:
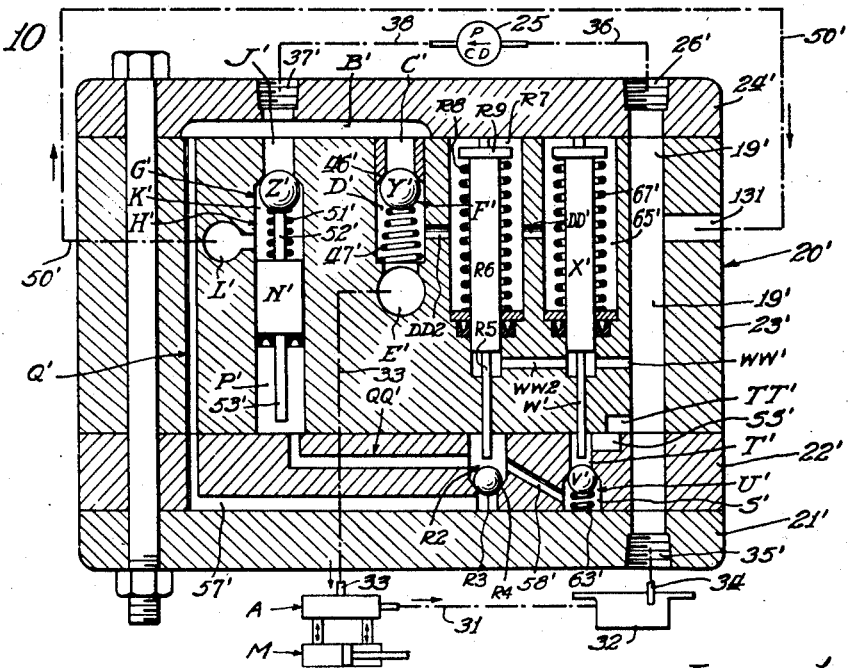
Fig. 10 is a sectional view taken through another embodiment of the invention, employing elements common to that of the first embodiment together with some additional elements, all cooperating to accomplish the same object as the first embodiment.

Description of the embodiment shown in Fig. 10:

That form of the invention shown in Fig. 10 is for the most part constructed and operable like that shown in Fig. 9. Therefore, to expedite the description of the Fig. 10 disclosure, there is no detailed description of those parts which are essentially identical with those illustrated in Fig. 9; instead, those parts are simply designated by the same reference character with a prime added. The primary difference between the Fig. 9 and Fig. 10 disclosures is that the disclosure in Fig. 10 employs an auxiliary control valve designated R2, in lieu of the restricted passage portion R in Fig. 9. The auxiliary control valve R2 includes a valve member R3 seatable upon a seat R4 within a section of the passage Q'. Said valve member R3 is adapted to be positively held upon its seat R4 by a valve stem portion R5 of a piston-like valve operating member R6 contained within auxiliary valve chamber R7. A spring R8 reacting between the bottom of the chamber R7 and a collar R9 fixed to the upper end of the member R6 yieldingly urges the member R6 to an upward position illustrated in the drawing. A lateral passage DD2 connects the channel D' and the chamber R7. A channel DD' connects the chamber R7 and the main control valve chamber 65', wherefore both of the chambers R7 and 65' will contain fluid at the same pressure as the fluid within the fluid-conducting passage D'.

*Operation of the apparatus shown in Fig. 10*

The apparatus shown in Fig. 10 is there illustrated in the fluid delivery condition wherein it is causing the delivery of fluid from the pump 25 to the motor M. Therefore, the valve A is conditioned for admitting fluid from one end of the motor and for receiving fluid from its opposite end for delivery into and through a conduit 31 into the reservoir 32. At this time, the pressure in the fluid delivery channel D' will be relatively low as will be the pressure of the fluid in the chambers R7 and 65'. Consequently, the springs R8 and 67' are effective for holding the valve operating members R6 and X' upwardly. The spring 63' therefore seats the valve V' preventing the escape of fluid delivered by the pump 25 to the control channel Q' escaping from said control channel to the low pressure passage 19' through the channel portions SS' and TT'. Thus the fluid accumulates in the channel Q' and the intermediate portion 58' of said channel Q', which intermediate channel portion 58' is included between the valves R2 and U'. Fluid is also accumulated under pressure in the channel QQ' and in the by-pass valve chamber P' for moving the valve control member N' upwardly to hold the by-pass valve member Z' decisively seated. Fluid therefore from the constant delivery pump 25 cannot by-pass the valve G' for flowing outwardly through the channel L', the conduit 50', channel 131, and into the low pressure channel 19' for return to the pump. Instead the fluid from the pump builds up sufficient pressure in the portions B' and C' to unseat the check-valve member Y' and pass to the motor through the channel E', conduit 33, and the valve A. Fluid concurrently discharged from the motor passes into valve A and thence to the reservoir 32 through the conduit 31. The reduced pressure in the channel E' and hence in the chambers R7 and 65', which communicate with the chamber E' through the channels DD2 and DD', permits the springs R8 and 67' to push the valve control members R6 and X' upwardly.

This condition in which fluid is delivered to the motor prevails so long as the valve A is open. Upon closing of this valve for stopping the motor, fluid can no longer escape from the lower end of the conduit 33, whereupon the delivery of fluid past the check-valve F' results in an increase of pressure within the valve chambers R7 and 67'. The pressure quickly builds up in these chambers, pushing the valve operating members R6 and X' downwardly, and upon the member X' abutting its valve stem portion W' with the valve member V', a further resistance to its movement is incurred by the force components responsively exerted by the spring 63' and the pressure of fluid within the channel portion S'. As previously described with respect to the embodiment in Fig. 9, an increment of potential force substantially equal and opposite to the force component incurred by the pressure of fluid in the passage portion S' is incurred by the pressure of fluid in the chamber 65', which potential force obtains until such time as the valve U' is "cracked" and at that time is utilized in quickly opening the valve U'. Preferably the spring R8 has substantially the same strength as the spring 65' so that the force exerted by the fluid downwardly upon the valve operating member R6 will be effective for holding the auxiliary control valve R2 closed when the control valve U' opens. When these valves U' and R2 are respectively opened and closed, fluid can no longer reach the by-pass valve chamber P' through the channel Q' and the lateral channel QQ'. However, the fluid trapped in the by-pass chamber P' can then escape through the lateral channel QQ', the intermediate channel portion 58', the valve U', and the channels SS' and TT' into the low-pressure pump return channel 19'. Thereupon, the by-pass valve control member N' is allowed to drop to its lowermost position with the stem 53' seated upon the bottom of the chamber P' to condition the by-pass valve G' for by-passing the fluid from the pump. When the by-pass valve G' begins to by-pass, the check-valve Y' prevents the back flow of fluid toward the motor, thereby maintaining the high pressure in the channel E' and the valve chambers R7 and 65'.

Reestablishment of the fluid delivery condition, in which the apparatus is illustrated in Fig. 10, will be had upon a subsequent opening of the valve A which permits the delivery of actuating fluid to the motor M and a drop of pressure in the valve chambers R7 and 65'.

*Description of the apparatus shown in Fig. 11*

The apparatus shown in Fig. 11 like that shown in Fig. 10 has operating characteristics like the apparatus of Fig. 9 and for the most part has elements respectively corresponding to elements in Fig. 9, wherefore these corresponding elements will be designated by the same reference characters as in Fig. 9 but with a prime added. The use of a letter as part of a reference character in Fig. 11 denotes that the element designated by that letter is associated with an element corresponding to that designated by such letter in Fig. 9. Said apparatus in Fig. 11 differs primarily from that in Fig. 10 only in so far as the elements are rearranged in their relative positions and some of the elements are of a different size and shape than the corresponding elements in Fig. 10. The elements of Fig. 11 do, however, correspond element for element with those in Fig. 10. Consequently, the reference characters appearing in Fig. 11 are the same as those appearing in Fig. 10.

*Operation of the apparatus shown in Fig. 11*

There prevails in the apparatus as illustrated in Fig. 11 that phase in the operating cycle wherein the valve A for controlling the flow of fluid to the motor M is open, resulting in the flow of fluid through the device to the motor and the fluid-pressure closing of the by-pass valve G' to prevent the by-pass of fluid from the pump 25 through the channels B', K', and L', the conduit 50', and the channel 131 to the low-pressure pump return passage 19'. Since the pressure in the channel D', because of the flow of fluid to the motor, is relatively low as is the pressure in the chambers R7 and 65' which communicate with the channel portion D' through the channels DD2 and DD, the springs R8 and 67' are operable for holding the valve occupying member R6 and X' in their upward positions shown. Consequently, the control valve spring 63' is effective for seating the control valve member V' to prevent the escape of fluid impressed from the pump through the channels B' and Q', the latter channel including a channel portion 57' which passes behind the channel E' in the plate 21', channel portions S' and T', and the intermediate portion 58'. Hence, the pressure in these just recited channel portions becomes equal to that at which the pump delivers fluid into the channel B', and extends this pressure fluid through the lateral QQ' to the channel P' associated with the by-pass valve G'. This relatively high-pressure fluid acting upon the hollow piston N' supplements the force of the spring 51' for decisively seating the by-pass valve to incur the non by-pass condition referred to above.

So long as the valve A remains open so that the motor is driven and utilizes fluid received through the fluid-conducting channel E' from the pump, the pressure within the valve chambers R7 and 65' will remain sufficiently low for the springs R8 and 67' to maintain the valve-actuating members R6 and X' upwardly in the position illustrated so that the fluid delivery phase of the operating cycle will prevail. However, upon the valve A being closed, fluid can no longer escape from the channel E' through the conduit 33 whereupon fluid will be delivered through the channel DD2 and the channel DD into the valve chambers R7 and 65' to quickly increase the pressure in these chambers and in the channel DD for forcing the valve actuating members R6 and X' downwardly. The operation is the same as that described above in forcing the valve operating members R6 and X' of Fig. 10 downwardly to effect the sequential closing and opening of the valves R2 and U', the former closing slightly before opening of the latter. With the valve R2 thus closed, no fluid can be delivered from the channel Q' into the lateral QQ' to the by-pass valve chamber P', and with the valve U' opened, the fluid from this by-pass valve chamber can escape through the lateral QQ', the intermediate portion 58' of the control channel Q' and past the valve U' through the channel portions SS' and TT' to the low-pressure pump intake passage 19'. Thereupon the by-pass valve G' is conditioned for by-passing through the channel L', conduit 50', channel 131, and the low-pressure intake passage 19' for the pump. This by-passing phase of the operating cycle, during which the constant delivery pump can by-pass by the valve G' at a relatively low pressure, will prevail until such time as the valve A is again opened, causing motor operation.

*Description of the apparatus shown in Fig. 12*

In that form of apparatus illustrated in Fig. 12, the by-pass valve is set under control of fluid pressure derived from an auxiliary pump, such as the pump for supplying oil under pressure to the parts of an internal combustion engine and driven from such engine. This pump is shown at 135 and has associated with it a sump 136 to which oil is returned from the apparatus and from which the pump draws the oil preparatory to forcing it into the apparatus through a conduit 137 which leads to a channel 138 in the casing of the device.

The device or apparatus has many parts or elements corresponding to those in the embodiment in Fig. 9, wherefore these elements are designated by the same respective reference characters as appear in Fig. 9 but with a prime added. In some instance as in the case of the valve V10, the letter in the reference character is associated with a digit instead of a prime to signify that the designated part is related in function to the part designated by that letter in Fig. 9. Instead of utilizing a constricted passage as the passage R in the control channel Q of the embodiment in Fig. 9, the Fig. 12 embodiment employs a valve R10, and since the function of this valve is related to the function of the restricted passage R in Fig. 9, the reference characters of the parts associated with this valve R10 contain the letter "R." In the respect that the valve R10 is employed in Fig. 12 instead of the passage R of Fig. 9, the Fig. 12 embodiment has an operating principle similar to the Fig. 10 embodiment which employs a valve R2 serving the same general function as the valve R10. Thus the Fig. 12 and Fig. 10 embodiments operate upon the same general principles with the exception that the Fig. 12 embodiment uses an auxiliary pump for supplying fluid which controls the position of the by-pass valve instead of using fluid from the main pump 25.

Only three plates, 132, 133, and 134, are used for forming the valve casing of the present form of apparatus. The upper and lower faces of the center plate 133 are flat and smooth for fitting in sealed relation respectively with the upper and lower faces of the plates 132 and 134, wherefore the open channel portion E' in the lower face of the plate 134 is closed or converted into a buried channel by the plate 133, and likewise a bleeder channel 139, which is formed as an open channel on the lower face of the plate 133, is closed or converted into a buried channel by the plate 132. Stop members 141 and 142 rest upon shoulders 143 and 144 in the upper ends of the valve chambers 65' and R7, and each of these stop members is provided with lugs 145 which engage the plate 134 for preventing displacement of the stop members 141 and 142 from the shoulders 143 and 144 under the operating condition, wherein there is an absence of fluid pressure in the chambers 65' and R7 sufficient to overcome the force of the springs 67' and R8 when these springs will press the collars R9 and X9 upwardly against said stop members 141 and 142. At this time the valve operating members X' and R13 would be raised for closing the valve V10 and opening the valve R10.

A by-pass valve chamber K' is formed in the left end of the plate 132 by drilling a recess 146 and threading an outer end portion of this hole for receiving a threaded plug 147. A by-pass piston member Z' constituting a part of the by-pass valve G' is urged to the right by the spring 51'' against the bottom 148 of the recess 146 into the by-passing condition wherein a circumferential groove 149 in the member Z' is alined between the channels J' and L', wherefore fluid delivered from the pump 25 is by-passed with respect to the motor M, such fluid flowing from the pump through the conduit 38, port 37', channels B' and J', groove 149 in the member Z', channel L', and the conduit 50' back to the reservoir 32 from which the fluid was initially drawn through the conduit 36.

The plate 132 is further drilled with a counterbore forming a channel 151 extending to the right from the bottom of the recess 146. Laterals 152 and 153 communicate between the channel 151 and the openings within the valve seats 62' and R12 for the control valves V10 and R10. A lever mechanism for operably connecting the main control valve operating member X' with a control valve member V20 is contained within a recess 150 in the bottom of the plate 133. This connecting mechanism comprises a lever 154 pivoted upon a fulcrum pin 155 which is carried in a small standard 156 mounted upon a support plate 157 suitably secured to the upper face of the plate 132. Bifurcated opposite ends of the lever 154 are respectively articulately connected with the valve member V20 and the lower end of the valve operating member X' by means of pins 158 and 159. When the valve V10 is open, fluid can escape from the channel 151 through the lateral 152, recess 150, a channel 161, and a conduit 162 to the sump 136 from which the engine oil pump 135 is supplied with fluid.

Operation of the apparatus disclosed in Fig. 12:

The apparatus as illustrated in Fig. 12 is set for by-pass. The valve A for controlling the admittance of fluid from the conduit 33 into the motor M is closed as is the check-valve F', trapping fluid under pressure in the valve chambers 65' and R7 for holding the valve control members X' and R13 downwardly in opposition to the upward force of their associated springs 67' and R8. The valve R10 thus closed precludes the delivery of fluid from the engine oil pump through the conduit 137 and channel 138 into the channel 151, while the valve V100 allows the escape of fluid from the channel 151 through the recess 150, channel 161, and conduit 162 to the engine oil sump 136. This low pressure condition within the channel 151 permits the by-pass valve spring 51' to force the valve member Z' against the recess bottom 148 alining a circumferential groove 149 with the by-pass channel portions J' and L'. Upon the opening of a valve A for allowing some of the fluid to escape from the conduit 33 into the motor M for propelling the same, the pressure in the valve chambers 65' and R7 will be reduced whereupon the springs 67' and R8 will lift the valve control members X' and R13, closing the valve V10 and opening the valve R10. When this operation of the valves V10 and R10 occurs, fluid can no longer escape from the channel 151 past the valve V10 and through the aforetraced passages to the sump 136, and the fluid delivered by the engine oil pump will flow past the valve R10 into the channel 151 for increasing its pressure and forcing the by-pass valve member Z' to the left and terminating the by-pass condition by projecting the circumferential groove 149 out of registry with the channel portions J' and L'. Therefore, with the by-pass valve closed, the presure will build up quickly in the channels B' and C' to unseat the check-valve member Y' and cause the passage of fluid through the channel E', port 163, and conduit 33 to the valve A and thence to the motor M to continue operation of the latter. The springs 67' and R8 are selected of such strength that they will maintain the valve operating members X' and R13 in their upper positions under pressures incurred within the valve chambers 65' and R7 during normal motor operation. However, after the motor has been driven the desired amount, the valve A is closed causing the fluid pressure to build up in the conduit 33 and valve chambers 65' and R7, whereupon the valve operating members X' and R13 are forced downwardly to their illustrated positions, closing the valve R10 and opening the valve V10 to cause the drainage of fluid from the channel 151 and the return of the by-pass valve member Z' to the by-pass condition shown under the force of the spring 51'.

*Description of the modification shown in Fig. 13*

That form of the invention shown in Fig. 13 also has many of the elements of the form shown in Fig. 9, and to expedite this description of the apparatus those parts or elements corresponding to elements in Fig. 9 will be designated by the same respective reference characters with the addition of a prime and in some instances with the addition of a digit. This form of the invention differs from the Fig. 9 form in that an auxiliary control valve R2 is employed in lieu of the restricted passage R, and in this respect this form of the invention is similar to that shown in Fig. 10. It is similar to the Fig. 12 embodiment in that the by-pass valve G' is actuated by fluid received from an auxiliary pump 136 which may be the engine pump of a motor vehicle. However, the fluid utilized in the device from the engine oil pump acts in opposition to the force of the fluid pumped by the main pump 25, the relatively low-pressure fluid of the engine pump being introduced into the large by-pass valve chamber P' beneath the piston-like valve operating member N' in opposition to the relative high-pressure fluid from the main pump 25 forced into the passage J' for acting upon a relatively small area of the by-pass valve member Z'. Since the pressure of fluid received from the engine pump 135 for acting upon the lower end of the piston-like member N' is relatively low, 35 to 70 pounds per square inch, compared to the pressure incurred in the channel portion J' during the phase in the operation of the device when fluid is to be delivered to the motor M and when the by-pass valve G' is to be held closed, the by-pass valve chamber P' must be of much greater diameter than the chamber P in Fig. 9 in comparison to the upper area portions of the by-pass valve members Z' and Z which are subjected to the high-pressure fluid.

*Operation of the apparatus shown in Fig. 13*

The apparatus is shown in Fig. 13 with its various elements as they are disposed during that phase of the operating cycle when fluid is being delivered through the apparatus and through the valve A for driving the motor M. It will be noted that the by-pass valve G' is closed, wherefore fluid from the motor driving pump 25 enters the port 37' through the conduit 38 and thence passes into the channel B' and thence through the channel C' past the check-valve F' and through the channel E', conduit 33, and the valve A to the motor. Fluid discharged from the motor returns to the valve A from which it is discharged into the reservoir 32 through the conduit 31. During flow of fluid through the passage portion D' en-route to the motor M, the pressure within this passage portion and within the valve chambers R7 and 65' will not be sufficient to force the valve operating members R6 and X' downwardly against the upward force of the springs R8 and 67'. Hence the valve U' will be closed and the valve R2 opened. As a consequence of this status in the operation of the valves U' and R2, fluid from the engine oil pump 135 passes upwardly through the channel Q' and into the intermediate channel portion 58' between the valves R2 and U' from which it cannot escape past the valve U'. Therefore, the engine oil pump is operable to force the fluid through the passage QQ', which passes back of the vertical channel E', into the by-pass valve chamber P' where sufficient unit pressure is attained for forcing the valve operating member N' upwardly to the position shown for holding the by-pass valve member Z' seated against the total downward force of the main pump fluid tending to move said valve member Z' downwardly. While the unit pressure of fluid in the channel J' will be higher than that in the chamber P', the total force upwardly on the member N' will exceed that acting downwardly on the member Z' whereby the member N' is the boss.

Delivery of fluid from the motor-operating pump 25 to the motor M will continue so long as the valve A remains open, but after the motor has operated a desired amount, the operator will close the valve A, stopping the escape of fluid from the lower end of the conduit 33. As a consequence, the fluid pumped by the pump 25 will incur sufficient pressure in the chambers R7 and 65' to force the valve operating members R6 and X' downwardly, opening the valve T' and closing the valve R2. Closing of valve R2 prevents fluid from the engine pump reaching the intermediate passage 58', and opening of the valve U' permits fluid to escape from the by-pass valve chamber P' through the channel QQ', intermediate passage 58', past said valve U', and through the channel SS2, port SS3, and the conduit 137 back to the engine oil sump 136. Thereupon the by-pass valve operating member N' will descend into its by-pass operating condition with the stem 53' resting upon the bottom of the chamber P' and with the spring 51' urging the member Z' toward its valve seat with a relatively small force which permits the by-pass of fluid from the pump 25 at a low pressure incurring but slight effort of the pump and incurring no substantial heating of the oil or the fluid. The fluid by-passing the valve G' into that part of the chamber P' above the piston N' is discharged through the space above the piston N' and the conduit 50' back to the reservoir 32. Meanwhile the check-valve F' prevents the escape of the relatively high-pressure fluid from the chambers R' and 65' where this fluid maintains valve operating members R6 and X' downwardly to relieve the pressure below the by-pass operating member N' and preserve the by-passing condition of the apparatus until such time as the valve A is opened for causing the motor M to be driven.

While I have herein shown and described but a limited number of embodiments with the view of clearly illustrating the invention, it embraces such other forms and modifications falling within the scope and spirit thereof and not sacrificing all of its advantages.

What is claimed is:

1. In an apparatus for controlling delivery of fluid from a continuous delivery source to a place of controlled discharge, fluid conducting passage means communicative between said source and said place of discharge, a check valve in and dividing said passage means into inlet and discharge portions and operable to check return flow of fluid from the discharge to the inlet of such portions, by-pass passage means communicative with said inlet passage portion for by-passing fluid therefrom, a by-pass valve in the by-pass passage means and settable in a by-pass condition to allow by-pass flow of fluid through the by-pass passage from said inlet passage portion and also settable in a closed condition to check such by-pass flow, and means for setting said by-pass valve comprising a pressure responsive by-pass-valve setting member operable to set the by-pass valve in the closed condition when subjected to one status of fluid pressure differential and operable to set the by-pass valve in the by-pass condition when subjected to another status of fluid pressure differential, a fluid-receiving passage separate from the by-pass passage and communicative from the inlet portion of the fluid conducting passage means to the by-pass-valve setting member to impose said fluid pressure differentials thereon, said fluid-receiving passage having an opening which is openable and closable to respectively provide for the escape of fluid from such passage and for the trapping of fluid therein and thus control the pressure of fluid in such passage, a control valve for said opening, and control-valve setting means operable responsively to a predetermined minimum pressure in the discharge passage portion to set the control valve to create in the fluid-receiving passage a pressure subjecting the by-pass-valve setting member to the one status of pressure differential to incur said closed condition of the by-pass valve and operable responsively to a predetermined maximum pressure in the discharge passage portion to set the control-valve to create in the fluid-receiving passage a pressure subjecting the by-pass-valve setting member to the other status of pressure differential to incur said by-pass condition of the by-pass valve.

2. In an apparatus for controlling delivery of fluid from a continuous delivery source to a place of controlled discharge, fluid conducting passage means communicative between said source and said place of discharge, a check valve in and dividing said passage means into inlet and discharge portions and operable to check return flow of fluid from the discharge to the inlet of such portions, by-pass passage means communicative with said inlet passage portion for by-passing fluid therefrom, a by-pass valve in the by-pass passage means and settable in a by-pass condition to allow by-pass flow of fluid through the by-pass passage means from said inlet passage portion and also settable in a closed condition to check such by-pass flow, by-pass-valve operating means operable responsively to changes in fluid-pressure differential applied thereto to operate the by-pass valve, said valve-operating means being operable to place the by-pass valve in the closed condition when subjected to one status of fluid-pressure differential and to place said valve in the by-pass condition when subjected to another status of fluid-pressure differential, a fluid-receiving passage disposed in parallel with the by-pass passage and communicative with the by-pass-valve setting member to impose said fluid pressure differentials thereon, said fluid-receiving passage having an opening which is openable and closable to respectively release and trap fluid in such passage and thereby control the pressure of fluid therein, a control valve for said opening, and control-valve setting means operable responsively to a predetermined minimum pressure in the discharge passage portion to set the control valve to create in the fluid-receiving passage a pressure subjecting the by-pass-valve operating means to the one status of pressure differential to incur said closed condition of the by-pass valve and operable responsively to a predetermined maximum pressure in the discharge passage portion to set the control-valve to create in the fluid-receiving passage a pressure subjecting the by-pass-valve operating means to the other status of pressure differential to incur said by-pass condition of the by-pass valve.

3. In an apparatus for controlling delivery of fluid from a continuous delivery source to a place of controlled discharge, fluid-conducting passage means for communication between said source and said place of discharge, a check valve in and dividing said passage means into inlet and discharge portions and operable to check return flow of fluid from the discharge to the inlet of such portions, by-pass passage means for communication with said source to by-pass the fluid therefrom about said fluid-conducting passage means, pressure responsive by-pass valve means in control of the flow of fluid through the by-pass passage and operable responsively to different stati in pressure differential applied thereto to open and close said by-pass passage means, a fluid-receiving passage wherein the fluid pressure of the fluid is to be varied and subjected to said by-pass valve means to create the different stati in pressure differential, said fluid-receiving passage having opening means which is openable and closable to control the quantity and pressure status of fluid in said fluid-receiving passage, and pressure responsive control valve means in control of said opening means to open and close the same and operable responsively to a predetermined decrease of pressure in the discharge portion of the fluid-conducting passage to control said opening means for causing the pressure status in the fluid-receiving passage incurring closing of the by-pass valve and operable responsively to a predetermined increase of said pressure in the discharge portion of the fluid-conducting passage to control said opening means for causing the pressure status in the fluid-receiving passage incurring opening of the by-pass valve.

4. In an apparatus for controlling delivery of fluid from a continuous delivery source to a place of controlled discharge, fluid-conducting passage means for communication between said source and said place of discharge, a check valve in and dividing said passage means into inlet and discharge portions and operable to check return flow from the discharge to the inlet of such portions, a by-pass passage means for communication with said source to by-pass the fluid therefrom about said fluid-conducting passage means, pressure responsive by-pass valve means in control of the flow of fluid through the by-pass passage means, fluid-receiving passage means communicating with said fluid conducting passage means at the inlet portion thereof to receive fluid therefrom and containing a discharge opening closable to accumulate such fluid in such passage means to increase its pressure and openable to allow the escape of the fluid and diminution of such pressure, said by-pass valve means being subjectable to the pressure of the fluid in said fluid-receiving passage means and being operable to close the by-pass passage means when subjected to the pressure of the accumulated fluid and to open the by-pass passage means when subjected to the diminished pressure of the escaping fluid, and pressure responsive control valve means in control of said discharge opening to open the same upon a predetermined increase of pressure in said discharge passage portion and to close the same upon a predetermined decrease of pressure in said discharge passage portion.

5. In an apparatus for controlling delivery of fluid from a continuous delivery source to a place of controlled discharge, fluid-conducting passage means for communication between said source and said place of discharge, a check valve in and dividing said passage means into inlet and discharge portions and operable to check return flow from the discharge to the inlet of such portions, a by-pass passage means for communication with said source to by-pass the fluid therefrom about said fluid-conducting passage means, pressure responsive by-pass valve means in control of the flow of fluid through the by-pass passage means, fluid-receiving passage means for communication with said source to receive fluid therefrom, said fluid-receiving passage means having portions of relatively small and large flow capacity through which the fluid is successively flowable in the order named and also having a discharge opening in the large flow capacity portion and of a flow capacity exceeding that of the small flow capacity portion, said discharge opening being closable to cause accumulation of fluid in the fluid-receiving passage means to increase the pressure of such accumulated fluid and openable to allow the escape of such fluid and diminution of its pressure, said by-pass valve means being subjectable to the pressure of fluid in said large flow capacity passage means portion and being operable to close the by-pass passage means when subjected to the pressure of the accumulated fluid and to open the by-pass passage means when subjected to the diminished pressure of the escaping fluid, and pressure responsive control valve means in control of said discharge opening to open the same upon a predetermined increase of pressure in said discharge passage portion and to close the same upon a predetermined decrease of pressure in said discharge passage portion.

6. In a fluid-pressure regulator, a fluid-receiving chamber for communication between a source of fluid under pressure and a place of fluid demand, a fluid-receiving channel having portions of relatively small and large flow capacity and inlet and discharge openings respectively for said portions to provide for the successive flow of fluid therethrough in the order named, the flow capacity of the discharge opening also exceeding that of the small flow capacity channel portion and said discharge opening being closable and openable to create respective conditions of high and diminished pressure in the large flow capacity portion of such channel, settable valve means settable responsively to such high and diminished pressure to respectively establish and terminate introduction of fluid into said chamber, and control valve means in control of said discharge opening and operable responsively to an increase of pressure in said chamber, incurred by the introduction of fluid therein as aforesaid, to open the discharge opening of said channel to diminish the pressure therein and thus cause setting of the settable valve means for terminating the introduction of fluid into the chamber.

7. In an apparatus for controlling delivery of fluid from a continuous delivery source to a place of controlled discharge, fluid conducting passage means for communication between said source and said place of discharge, a check valve in and dividing said passage means into inlet and discharge portions and operable to check return flow from the discharge to the inlet of such portions, a by-pass passage means for communication with said source to by-pass the fluid therefrom about said fluid-conducting passage means, pressure responsive by-pass valve means in control of the flow of fluid through the by-pass passage means, fluid-receiving passage means including an intermediate portion having inlet and outlet ends of which either is closable to check the escape of fluid therepast, said by-pass valve means being subjectable to the pressure of fluid in said intermediate passage portion and being operable to close the by-pass passage means when subjected to the pressure of fluid caused to be accumulated in said intermediate passage portion by the closing if its said outlet end and being operable to open said by-pass passage when subjected to a diminished fluid pressure caused in said intermediate passage portion by the closing of its inlet end and the opening of its outlet end, and pressure responsive valve means for opening and closing the ends of said intermediate passage portion, said pressure responsive valve means being operable responsively to a predetermined minimum pressure in the discharge portion of the fluid-conducting passage means to open the inlet end of the intermediate passage portion and close the outlet end thereof and operable responsively to a predetermined maximum pressure in said discharge portion to close said inlet end and open said outlet end.

8. In a fluid pressure regulator, a fluid-receiving chamber for communication between a source of fluid under pressure and a place of fluid demand, a fluid-receiving channel having portions of relatively small and large flow capacity and inlet and discharge ports respectively for said portions to provide for the successive flow of fluid therethrough in the order named, the flow capacity of the discharge port also exceeding that of the small flow capacity channel portion and said discharge port being closable and openable to create respectively conditions of high and diminished pressure in the large flow capacity channel portion, settable valve means settable responsively to such high and diminished pressure to respectively establish and terminate introduction of fluid into the chamber from said source, and control valve means including a valve member disposable in the fluid-receiving channel discharge port to close the same and thus cause setting of the settable valve means to establish the aforesaid introduction of fluid into said chamber, said control valve means being operable to so dispose said valve member responsively to a predetermined decrease of pressure in said chamber, and said control valve means being further operable in response to an increase of pressure in said chamber, caused by the consequent introduction of fluid thereinto as aforesaid, to incur a coordinately increasing potential force ultimately sufficient to move said valve member for opening said discharge port against the reactive force of fluid pressure in the channel wherefore upon the initial opening of said port and the escape of fluid therethrough, to diminish the pressure in said channel, said potential force will suddenly predominate over the reactive force to quickly and decisively open said port.

9. In a fluid flow regulating unit; a casing including a plurality of plates; a first of said plates having an obverse face and fluid-admitting channel means opening into such face; a second of said plates having obverse and reverse faces of which the latter is fitted onto the obverse face of the first plate, the second plate having fluid-delivery, fluid by-pass and control openings extending between the faces thereof and communicating at their reverse face ends with the fluid-admitting channel means, said delivery and by-pass openings being enlarged at their obverse face ends to respectively form a check-valve seat and a by-pass valve seat, the control opening being enlarged at its reverse face end to form a control valve seat; check-valve, by-pass valve and control valve members respectively seatable upon said valve seats; a third of said plates having a reverse face fitted onto the obverse face of the second plate and containing check-valve, by-pass valve and valve-stem-receiving spaces respectively registering with said valve members; said casing having a delivery channel for the discharge of fluid passed through the fluid-delivery opening from the fluid-delivery channel means and a by-pass channel for the fluid passed through the by-pass opening from the fluid-delivery channel means; means in the check-valve space to urge the check-valve member seated; by-pass valve operating means in the by-pass valve space normally allowing the by-pass valve member to unseat for the flow of fluid through the by-pass opening into said by-pass channel but energizable, when subjected to the pressure of fluid in the fluid-admitting channel, to firmly seat the by-pass valve member, said casing having a channel communicating between the fluid-admitting channel means and the by-pass valve operating means to so subject the latter to said pressure, said casing containing channel portions providing communication for the reverse face and obverse face ends of the control opening respectively with the last-named channel and with the by-pass channel so that upon unseating of the control valve member the pressure upon the by-pass valve operating means will be diminished to allow the by-pass valve member to unseat; and valve stem operating means operable responsively to pressure thereon to move said valve stem for unseating the control valve member, and said casing containing a further channel communicating between said delivery channel and said valve stem operating means to move the latter for unseating the control valve member upon a predetermined increase of pressure in said delivery channel.

10. In a fluid flow regulating unit; a casing including a plurality of plates; a first of said plates having an obverse face, a fluid-admitting open channel in such face, and a lateral channel communicating with the fluid-admitting channel; a second of said plates having obverse and reverse faces of which the latter is fitted onto the obverse face of the first plate to convert the open channel into a buried channel, the second plate having a fluid-delivery opening, a fluid by-pass opening and a control opening all extending between the faces thereof and communicating with said fluid-admitting channel, such communication of the control opening being through said lateral channel, said fluid-delivery and by-pass openings being enlarged at their obverse face ends to respectively form a check-valve seat and a by-pass valve seat, the control opening being enlarged at its reverse face end to form a control valve seat; check-valve, by-pass valve and control valve members respectively seatable upon said check-valve, by-pass valve and control valve seats; a third of said plates having a reverse face disposed upon the obverse face of the second plate and containing check-valve, by-pass valve and valve-stem-receiving spaces respectively alined normally of the plates with said check-valve, by-pass valve and control valve members; said casing containing a by-pass discharge channel through which fluid by-passed through the by-pass opening is dischargeable; means in the check-valve space normally urging the check-valve member seated; by-pass valve operating means in the by-pass valve space normally allowing the by-pass member to unseat for opening the by-pass opening and allowing by-pass fluid through said discharge passage but energizable, when subjected to the pressure of fluid in said fluid-admitting channel, to firmly seat said by-pass valve member and prevent such by-pass of fluid, said casing containing a channel communicating through said plates between said lateral channel and said by-pass valve operating means to so subject the latter to the pressure in the fluid-admitting channel, said casing containing a control channel communicating between the obverse face end of the control opening and said discharge channel to conduct fluid from said lateral channel and thereby preclude the subjection of the by-pass valve operating means to said pressure in the fluid-admitting channel when the control valve member is unseated; and valve stem operating means operable responsively to pressure thereon to move said valve stem for unseating the control valve member, and said casing containing a further channel communicating between the check-valve space and said valve stem operating means to move the latter for unseating the control valve member upon a predetermined increase of pressure in said check-valve space.

CARL W. MOTT.

REFERENCES CITED

The following references are of record in the file of this patent:

UNITED STATES PATENTS

| Number | Name | Date |
|---|---|---|
| 2,312,877 | Campbell | Mar. 2, 1943 |
| 1,817,365 | Goss | Aug. 4, 1931 |
| 2,316,445 | Marshall | Apr. 13, 1943 |
| 2,277,573 | Wichorek | Mar. 24, 1942 |
| 2,073,835 | Finley | Mar. 16, 1937 |
| 2,204,530 | Eston | June 11, 1940 |
| 2,243,815 | Griswold | May 27, 1941 |
| 2,275,963 | Herman | Mar. 10, 1942 |